United States Patent Office 3,154,605
Patented Oct. 27, 1964

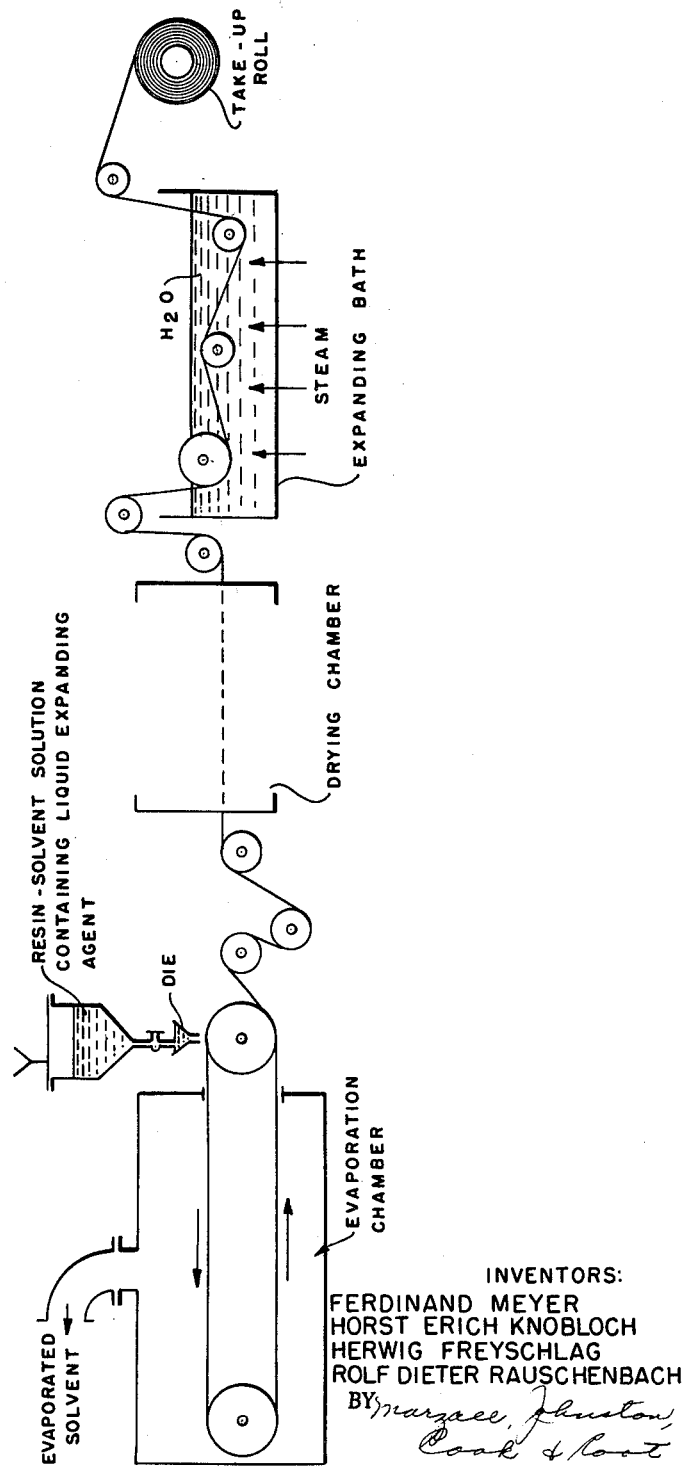

3,154,605
PRODUCTION OF EXPANDED FINE-PORED AND LIGHTWEIGHT BANDS FROM THERMOPLASTIC SYNTHETIC RESINS
Ferdinand Meyer, Ziegelhausen, Horst Erich Knobloch, Mannheim, and Herwig Freyschlag and Rolf Dieter Rauschenbach, Ludwigshafen (Rhine), Germany, assignors to Badische Anilin- and Soda-Fabrik Aktiengesellschaft, Ludwigshafen (Rhine), Germany
Filed Aug. 8, 1960, Ser. No. 47,909
Claims priority, application Germany Aug. 11, 1959
12 Claims. (Cl. 264—53)

This invention relates to the production of porous sheeting, films and bands from thermoplastic synthetic resins. More particularly, this invention relates to the production of porous sheeting, films and bands from polycarbonates and especially from high molecular weight polymers of vinyl compounds.

It is known to produce porous plastics by treating thermoplastic synthetic resins with liquids which do not dissolve or only swell the same, as expanding agents, and then expanding the products. The thermoplastic synthetic resin, for example polystyrene, is stored in these liquids for a prolonged period at atmospheric or increased pressure, and the penetration of the non-solvents can be accelerated by adding small amounts of solvent. However, only small amounts of solvent should be added in order to avoid caking of the individual polystyrene particles. Mixtures of solvents and non-solvents have also already been used to render porous the surface of shaped articles of thermoplastic synthetic resins.

It is further known to produce porous films or coatings of plastics by dissolving the plastics in a solvent with the addition of a swelling agent. The solvent should have a considerably lower boiling point than the swelling agent and after evaporation of the solvent, the mass containing the swelling agent is expanded by heating to temperatures at which the swelling agent vaporizes and the resin is thermoplastic. As solvent for polystyrene there is used methylene chloride and as swelling agents non-aromatic hydrocarbons whose boiling point is appreciably above that of the solvent, for example gasoline with a boiling range of 95° to 120° C. According to this known method it is possible only to produce coarse-pored expanded materials, as for example films with a bulk density of about 300 grams per liter.

It is an object of the present invention to provide a process for the production from thermoplastic synthetic resins of expanded sheeting, films and bands which are especially fine-pored and light-weight.

A further object of this invention is a process for the production of expanded sheeting, films and bands from polycarbonates and especially from high molecular weight polymers of vinyl monomers.

Another object of the invention is a process for the production of expanded sheeting, films and bands from afterchlorinated polyvinyl chloride and polystyrene.

A further object of the invention is a process for the production of expanded sheeting, films and bands from mixtures of thermoplastic synthetic resins which contain high molecular polymers or copolymers of styrene and also polymers or copolymers of other vinyl monomers, such as vinyl halides, vinyl esters and/or esters of alpha, beta-unsaturated carboxylic acids.

Further objects of the invention will be apparent from the following detailed description.

The objects of this invention are achieved by applying to a support a solution of a thermoplastic synthetic resin in a mixture of a low-boiling solvent which dissolves the plastic well and an organic liquid which does not dissolve the plastic or only swells it and has a boiling temperature at the most inconsiderably higher but preferably lower than that of the solvent, evaporating the solvent at a temperature below the softening temperature of the plastic, and then subjecting the expandable sheeting, films or bands obtained in this way to expansion by heating to temperatures above the softening temperature of the plastic.

It is surprising that the organic liquids which do not dissolve the plastic or only swell the plastic should be retained by the thermoplastic synthetic resins in spite of their low boiling temperature, which is preferably lower than that of the solvent, while the solvent evaporates, and that from the composition resulting by evaporation of the solvent very fine-pored elastic expanded articles with especially low bulk densities are obtained.

Thermoplastic synthetic resins falling within the scope of the present invention include polycarbonates, i.e., linear polycondensation products from dihydroxy compounds and phosgene having recurring OCO-groups in the main chain. Furthermore there are useful high molecular weight polymers obtained in the usual way from vinyl monomers, as for example from aromatic compounds substituated by vinyl groups, such as styrene, chlorstyrene, alpha-methylstyrene and N-vinylcarbazole, and/or vinyl halides such as vinyl chloride, vinyl fluoride, vinylidene chloride and vinylidene fluoride, and/or acrylonitrile, and/or vinyl esters of saturated aliphatic monocarboxylic acids, such as vinyl acetate, vinyl propionate and vinyl butyrate, and/or esters of alpha,beta-unsaturated aliphatic mono- and di-carboxylic acids, such as acrylic acid, methacrylic acid, maleic acid and fumaric acid, and monohydric linear and branched aliphatic or cycloaliphatic alcohols with 1 to 10 carbon atoms, such as methyl, ethyl, propyl, isopropyl, 2-ethylhexyl, decyl or cyclohexyl alcohol. Such high molecular weight polymers may also contain as copolymer components: aliphatic diolefines, such as butadiene-1,3,2-chlorbutadiene-1,3 or isoprene, polymerized in such amounts that the polymers are still soluble in solvents. Polymers especially suitable for the process according to this invention are polystyrene and copolymers of styrene with monomers of the above-mentioned kind as well as polyvinylchloride and polystyrene which have been afterchlorinated in the usual way. Mixtures of such polymers and copolymers are also especially suitable for this process, especially mixtures which contain as components 20 to 90% by weight, preferably 50 to 80% by weight, with reference to the total amount of thermoplastic synthetic resin in the solution, of high molecular weight polymers or copolymers of styrene.

Low-boiling, non-solvent or only swelling organic liquids which serve as expanding agents are in general readily volatile substances with a low diffusion speed in thermoplastic synthetic resins, as for example aliphatic hydrocarbons, such as pentane, hexane, petroleum ether or cyclic hydrocarbons, such as cyclohexane, cyclohexene, cyclopentane or cyclopentene. As solvents there may be used above all those, like methylene chloride, carbon disulfide, methyl formate and acetonitrile and others, which have a high diffusion speed in thermoplastic synthetic resins and which dissolve the resins well. Low-boiling solvents are those with boiling points below the softening point of the thermoplastic resin used. The expression "at the most inconsiderably higher" means a difference in boiling point between solvent and non-solvent organic liquid which in the case of higher boiling non-solvents amounts to 30° C. It is, however, preferable to use non-solvents with boiling points below the boiling point of the solvent.

For the production of sheeting it is convenient to prepare an about 10 to 50% by weight solution of the thermoplastic synthetic resin. To this solution there are added 5 to 50, preferably 15 to 30, percent by weight of the non-solvent organic liquid, with reference to the resin used. The components are intimately mixed. The solution may if necessary be filtered in a pressure filter for removal of small undissolved portions. The solution, filtered if necessary, is cast in the usual way to a sheet, the thickness of the sheet depending on the viscosity of the mixture. If it is desired to prepare very thick sheets, for example with a thickness of up to 10 mm., or bands, it is preferable to use very highly viscous solutions which contain about 50% by weight of resin of the said kind. Such highly viscous solutions may if necessary be prepared in kneaders from the components. The solvent should have a boiling temperature which lies below the softening range of the resin used. It may be evaporated by laying in the air at room temperature or at elevated temperatures which lie below the softening range of the synthetic resin, or at reduced pressure. To accelerate the evaporation, a stream of air or inert gas may be passed over the sheets and bands which contain solvent. The temperature of the air or inert gas should however not be too high so that premature expansion is avoided. The purpose of the support is to make it possible for the solvent to be removed from the sheet- or band-shaped resin. A suitable support may be a table, a conveyor belt, preferably an endless metal belt, or a revolving drum with a large diameter.

In this way expandable sheets and bands may be produced from thermoplastic synthetic resins which contain the low boiling non-solvent or swelling organic liquids serving as expanding agents in homogeneous distribution. They can be expanded as usual by short-term heating, preferably in hot water or with hot steam, by irradiation with infrared light or by high-frequency heating to expanded sheets and bands with very low bulk densities which, depending on the conditions of the expansion, lie between 10 and 40 grams per liter. The expansion is preferably carried out at temperatures which lie above the softening temperature of the thermoplastic synthetic resin used but below its decomposition point. It is preferable to carry out the expansion at temperatures which lie 5° to 50° C. above the softening temperature.

In addition to the non-solvent or only swelling organic liquids acting as expanding agents, the resin solutions may also contain other substances, such as dyestuffs, substances which split off gas when heated, flameproofing agents and the like.

The expanded articles obtained according to this process have a large variety of applications in the insulating and packing fields. Sheets prepared according to this invention are suitable for example for the production of cups, as heat-insulating packings, as wallpaper, or for insulating electrical conductors. Expanded sheets may be molded at elevated temperature, for example by the deep drawing method.

The accompanying drawing is a schematic illustration of one embodiment of the invention and indicates the manner in which the resin-solvent solution containing the expanding agent can be cast or poured through a die onto an endless supporting belt to form a liquid band or film, the solvent first being removed from the band in the evaporation chamber and subsequently in the drying chamber at temperatures below the softening point of the resin. The film or band is then expanded in the water bath with steam at a temperature above the softening point of the resin, and the expanded band is wound onto the take-up reel.

The following examples will further illustrate this invention but the invention is not restricted to these examples. The parts are parts by weight.

*Example 1*

1 part of a copolymer derived from 90 parts of styrene and 10 parts of butadiene is dissolved in 3 parts of methylene chloride of the boiling point 40° C. This solution is well mixed with 0.3 part of pentane of the boiling point 36° C. A film about 0.7 to 0.8 mm. thick is then cast from the solution. After evaporation of the methylene chloride by lying in the air, the sheet is expanded by heating for 5 minutes in boiling water. An elastic, fine-pored film is obtained with the bulk density 20 grams per liter.

*Example 2*

3 parts of a copolymer derived from 80 parts of styrene and 20 parts of methylstyrene are dissolved in 7 parts of methylene chloride and 0.6 part of hexane of the boiling point 68° C. is stirred into this solution. From this solution, by evaporating the methylene chloride, a film is prepared which after expansion in boiling water has a thickness of 1 mm. and a bulk density of 25 grams per liter.

*Example 3*

4 parts of a copolymer derived from 90 parts of styrene and 10 parts of butadiene are intensely mixed in a kneader with 3 parts of methylene chloride and 1.4 parts of pentane and the highly viscous solution formed is extruded as a band onto a support through a slot die with a 3 mm. wide slot. The solvent contained in the band is evaporated by leading thereover a current of air at a temperature of about 40° C. After expanding the solvent-free band in boiling water, an expanded band is obtained with a bulk density of 23 grams per liter.

*Example 4*

2.25 parts of after-chlorinated polyvinyl chloride (61% of chlorine) are dissolved in 7.75 parts of methylene chloride. 0.75 part of pentane is stirred in and a sheet is cast from the solution in the usual way. After evaporation of the solvent by lying in the air, the sheet is expanded for 1 minute in following steam at 100° C. A smooth elastic fine-pored sheet with a bulk density of 28 grams per liter is obtained.

*Example 5*

12.5 parts of a copolymer derived from 72 parts of styrene and 28 parts of acrylonitrile and 12.5 parts of a copolymer derived from 85 parts of vinyl chloride and 15 parts of vinyl acetate are dissolved in 75 parts of methylene chloride. The solution is stirred with 8.33 parts of pentane and cast in the usual way to a sheet. After evaporation of the solvent by storage in the air, the sheet is expanded in a waterbath or current of steam at 100° C. An elastic fine-pored expanded sheet is obtained.

*Example 6*

2 parts of a copolymer derived from 8 parts of vinyl chloride, 1 part of diethyl maleate and 1 part of dimethyl maleate are dissolved in 8 parts of methylene chloride. After stirring in 0.5 part of pentane a sheet is cast from this solution. After evaporation of the solvent, the sheet is expanded in a waterbath or a current of steam at 90° to 95° C. A fine-pored expanded sheet of especially great elasticity is obtained.

We claim:

1. A process for the production of porous bands from thermoplastic synthetic resins which comprises applying to a support a solution of a styrene polymer in methylene chloride, said styrene polymer being present in an amount of about 10 to 50% by weight with reference to the combined weight of said polymer and said methylene chloride and said solution further containing 5 to 50% by weight, with reference to said styrene polymer, of pentane, evaporating methylene chloride at a temperature below the softening point of said styrene polymer, and expanding said styrene polymer containing pentane by heating said styrene polymer to a temperature above its softening point.

2. A process for the production of porous bands from a thermoplastic synthetic resin which comprises: substantially completely dissolving said thermoplastic synthetic resin in a volatile organic liquid solvent therefor which has a boiling point below the softening point of said resin to provide a resin-solvent solution, said solution containing about 10 to 50% by weight of said resin with reference to the combined weight of the resin and its solvent; incorporating in said solution as an expanding agent about 5 to 50% by weight, with reference to said resin, of a volatile liquid hydrocarbon which does not dissolve said resin and which has a boiling point of not more than about 30° C. above the boiling point of said solvent; applying said resin-solvent solution containing said expanding agent to a support in the form of a band; evaporating said solvent from the applied band at a temperature below the softening point of said resin; and expanding said resin band containing said expanding agent by heating said resin to a temperature above its softening point.

3. A process as claimed in claim 2 wherein said solvent is a member selected from the group consisting of methylene chloride, carbon disulfide, methyl formate and acetonitrile, and said expanding agent is a member selected from the group consisting of pentane, hexane, petrol ether, cyclohexanone, cyclohexene, cyclopentane and cyclopentene.

4. A process as claimed in claim 3 wherein said expanding agent has a boiling point below the boiling point of said solvent.

5. A process as claimed in claim 3 wherein said resin is a styrene polymer.

6. A process as claimed in claim 5 wherein said resin-solvent solution contains about 15 to 30% by weight with reference to the resin of said expanding agent.

7. A process as claimed in claim 2 wherein the resin band is expanded to yield a solid expanded product having a bulk density of about 10 to 40 grams per liter.

8. A process as claimed in claim 2 wherein the thermoplastic synthetic resin is a styrene polymer.

9. A process as claimed in claim 2 wherein the thermoplastic synthetic resin is polystyrene.

10. A process as claimed in claim 2 wherein the thermoplastic synthetic resin is a copolymer of styrene and butadiene.

11. A process as claimed in claim 2 wherein the thermoplastic synthetic resin is a copolymer of styrene and methylstyrene.

12. A process as claimed in claim 2 wherein the thermoplastic synthetic resin is a vinyl chloride polymer.

References Cited in the file of this patent

UNITED STATES PATENTS

| | | |
|---|---|---|
| 2,744,291 | Stastny et al. | May 8, 1956 |
| 2,825,282 | Gergen et al. | Mar. 4, 1958 |
| 2,848,752 | Bechtold | Aug. 26, 1958 |
| 2,864,777 | Greenhoe | Dec. 16, 1958 |
| 2,893,963 | Cleland et al. | July 7, 1959 |
| 3,011,217 | Carlson | Dec. 5, 1961 |

FOREIGN PATENTS

| | | |
|---|---|---|
| 564,124 | Canada | Sept. 30, 1958 |